(12) United States Patent
Karl et al.

(10) Patent No.: US 9,020,658 B2
(45) Date of Patent: Apr. 28, 2015

(54) SYSTEM AND METHOD FOR MONITORING VEHICLE MASS TAMPER EVENTS

(75) Inventors: Charles Karl, Templestowe Lower (AU); David Dajia Cai, Carlton North (AU); Lloyd Davis, Spring Hill (AU); Chris Blanksby, Lilydale (AU)

(73) Assignee: Transport Certification Australia Limited (AU)

( * ) Notice: Subject to any disclaimer, the term of this patent is extended or adjusted under 35 U.S.C. 154(b) by 95 days.

(21) Appl. No.: 13/578,033

(22) PCT Filed: Jan. 12, 2011

(86) PCT No.: PCT/AU2011/000029
§ 371 (c)(1),
(2), (4) Date: Sep. 27, 2012

(87) PCT Pub. No.: WO2011/097667
PCT Pub. Date: Aug. 18, 2011

(65) Prior Publication Data
US 2013/0124007 A1    May 16, 2013

(30) Foreign Application Priority Data
Feb. 15, 2010  (AU) ................................ 2010900605

(51) Int. Cl.
*G05D 1/00* (2006.01)
*G05D 3/00* (2006.01)
(Continued)

(52) U.S. Cl.
CPC .............. *G06F 17/00* (2013.01); *G01G 19/086* (2013.01)

(58) Field of Classification Search
CPC ............................... G06F 17/00; G01G 19/086
USPC ................... 701/1, 2, 29.1, 32.8, 33.4
See application file for complete search history.

(56) References Cited

U.S. PATENT DOCUMENTS 4,839,835 A * 6/1989 Hagenbuch .................. 702/174
5,610,372 A * 3/1997 Phillips et al. ............. 177/25.14
(Continued)

FOREIGN PATENT DOCUMENTS

| EP | 0968892 A1 | 1/2000 |
| WO | 9207738 A1 | 5/1992 |

(Continued)

OTHER PUBLICATIONS

Karl C. et al., "On-Board Mass Monitoring Test Report (Final)", Transport Certification Australia, May 2009. See whole document especially pp. 33-36 and 55-56.
(Continued)

*Primary Examiner* — Calvin Cheung
*Assistant Examiner* — Paula L Schneider
(74) *Attorney, Agent, or Firm* — Lerner, David, Littenberg, Krumholz & Mentlik, LLP (57) ABSTRACT

A system for detecting a mass tamper event affecting a vehicle mass record for a vehicle being monitored includes a body bounce frequency estimator configured to estimate body bounce frequency for the vehicle and a mass estimator configured to estimate a vehicle mass, m, according to the equation (I), where k is a constant relating to a suspension system in the vehicle and $\omega_b$ is the estimated body bounce frequency. A first comparator compares the estimated vehicle mass value with an alternative vehicle mass value and identifies a mass tamper event when the estimated vehicle mass value differs from the alternative vehicle mass value by more than a pre-determined amount. An interface communicates mass tamper event data to a remote device. A system and method for recording vehicle mass data are also provided.

$$m = \frac{k}{\omega_b^2} \quad (I)$$

38 Claims, 6 Drawing Sheets

(51) Int. Cl.
*G06F 7/00* (2006.01)
*G06F 17/00* (2006.01)
*G01G 19/08* (2006.01)

(56) References Cited

U.S. PATENT DOCUMENTS

| | | | |
|---|---|---|---|
| 5,973,273 A * | 10/1999 | Tal et al. | 177/1 |
| 6,149,142 A * | 11/2000 | Penzotti | 267/64.19 |
| 6,339,749 B1 * | 1/2002 | Rieker et al. | 702/173 |
| 7,627,410 B2 * | 12/2009 | Berry et al. | 701/50 |
| 7,818,140 B2 * | 10/2010 | Dreier et al. | 702/173 |
| 8,311,844 B2 * | 11/2012 | McCaherty | 705/1.1 |
| 8,326,487 B2 * | 12/2012 | Moschuk et al. | 701/37 |
| 8,565,913 B2 * | 10/2013 | Emanuel et al. | 700/229 |
| 8,630,767 B2 * | 1/2014 | Karlsson et al. | 701/33.1 |
| 2008/0121438 A1 * | 5/2008 | Brown | 177/25.12 |
| 2009/0192664 A1 * | 7/2009 | Wolfgang et al. | 701/29 |
| 2010/0108406 A1 * | 5/2010 | Wuerthner et al. | 177/136 |
| 2011/0165286 A1 * | 7/2011 | Bachman et al. | 426/2 |

FOREIGN PATENT DOCUMENTS

| | | |
|---|---|---|
| WO | 2006136648 A1 | 12/2006 |
| WO | 2009067742 A1 | 6/2009 |

OTHER PUBLICATIONS

Karl C. et al., "A Regulatory On-Board Mass Monitoring Application for Heavy Vehicles in Australia", Proceedings of the 16th World Conference on Intelligent Transport Systems and Services, Sep. 21-25, 2009, Stockholm.
International Search Report for Application No. PCT/AU2011/000029 dated Mar. 29, 2011.
Extended European Search Report for Application No. 11741742.8 dated Jul. 17, 2013.

* cited by examiner

SYSTEM AND METHOD FOR MONITORING VEHICLE MASS TAMPER EVENTS

CROSS-REFERENCE OF RELATED APPLICATIONS

The present application is a national phase entry under 35 U.S.C. §371 of International Application No. PCT/AU2011/000029 filed Jan. 12, 2011, published in English, which claims priority from Australian Patent Application No. 2010900605 filed Feb. 15, 2010, all of which are incorporated herein by reference.

FIELD OF THE INVENTION

The present invention relates to heavy vehicle monitoring. It relates particularly but not exclusively to a system, method and apparatus for identifying possible tamper events affecting mass records obtained from on-board mass monitoring and other devices used to monitor vehicle mass. The systems, methods and apparatus may be used with an evidentiary system for monitoring a vehicle's compliance with conditions of road access which have been granted to a particular vehicle, particularly conditions pertaining to vehicle mass.

BACKGROUND TO THE INVENTION

Vehicle mass is a parameter of interest particularly in the area of road freight. There are different elements which make up vehicle mass:
 the mass of the vehicle and trailer itself which are together referred to as vehicle tare;
 the mass of the load applied to the vehicle which is referred to as the payload; and
 the total mass of the vehicle and its load which are together known as the total combination mass (TCM).

Vehicle tare may vary due to fuel loads but for the most part, this has little impact on the mass of a loaded vehicle during its journey. Commercial payload is typically measured at the point of loading and is usually an important figure in a commercial transaction. If the mass is not known or cannot be determined during the loading process, then weighbridges are used at the unloading site or elsewhere; the tare is deducted from the TCM measured by the weighbridge to determine payload.

Vehicle mass monitoring requirements depend on the needs of the end user of the mass data. For obvious reasons, customers, transporters and suppliers are interested in payload mass as this bears directly on financial return. Road authorities are likely to be more concerned about the overall TCM and axle group mass during travel as this can lead to assumptions about the impacts that use of that vehicle will have on traffic and the road pavement and bridges.

Static vehicle mass measurements used by transporters and suppliers are commonly determined using weigh-in-motion (WIM) stations, weighbridges (static and low speed) and portable scales. Once mass data is obtained using one of these systems, it may be recorded by the driver into vehicle log books. This is a static mass data entry, i.e. a snapshot of vehicle mass at that time. WIM stations enable a vehicle to be weighed without stopping. WIM data is low cost to collect but is inadequate for use in an evidentiary monitoring system because it is less precise. Weighbridges are more accurate but labour intensive and therefore higher cost. Another deficiency of currently used vehicle weighing techniques is that they only provide for intermittent checking of vehicle mass, e.g. when the vehicle is in the vicinity of a WIM station or weighbridge. Typically both weighbridges and WIM stations are permanent sites provided in main vehicle corridors which may not meet the needs of all users.

On-board mass-monitoring (OBM) is another means to measure mass and is capable of continuously monitoring mass for a vehicle during the course of its journey which may include intermittent loading and unloading points. An OBM sensor is essentially some form of transducer incorporated into the vehicle's suspension system to measure the mass of an individual axle or an entire axle group. For steel sprung suspensions, this typically involves use of load cells containing strain gauges. These are also used for the turntable of prime movers (fifth wheel). Load cells are usually installed as an integral part of the vehicle or trailer structure, as a load bearing member. For air bag suspensions, an OBM device typically involves use of air pressure transducers connected to the air output lines from the airbags of the vehicle suspension system.

In some OBM systems the electrical signal from the mass transducer is fed into some form of electronic buffer (typically associated with an axle group or vehicle combination unit). The buffer may condition or pre-process the incoming signal, combine/collate a number of incoming signals, digitise an incoming analogue signal by sampling at a particular frequency (e.g. 100 Hz to 20,000 Hz), store a number of mass records or even convert the mass signal to an actual mass value based on some pre-defined formula. Most OBM devices (also known as on-board vehicle mass-monitoring systems or OVMS) also provide some form of interface that allows users to configure the system, read and extract mass data from the unit and connect to other devices such as printers and wireless communications devices. In some systems this component also performs the functions of electronic buffers.

The commercial investment in an OBM system fitted to a vehicle can be justified in many cases because it permits the driver during loading to more accurately distribute the mass of the load on the vehicle (i.e. to legal weight limits over each axle group) and to reduce instances of under-loading which leads to revenue loss. Also, monitoring vehicle mass and load distribution using OBM devices reduces instances of overloading which can lead to lost profits due to fines (and loss of travel time), missed delivery deadlines and increased risk of hazard and accidents as well as uneven wear on vehicle tyres and the like.

There are various possibilities for tampering with OBM systems. For example, exposed cables in air bag suspension systems and the ability to "chock" load cell transducers on turntables expose OBM systems to tampering. Electronic tampering is less likely since most systems are password protected but this cannot be ruled out. Research indicates there is little incentive to tamper with OBM systems since the drivers themselves benefit from using them. Nevertheless, tamper-evidence is crucial to utilise measurements from OBM devices in an evidentiary system whose data can be relied on to check compliance with regulatory requirements.

Although a range of mass-monitoring devices are available on the market, few of them have the capability to provide mass determinations which can be used at an evidentiary level. It would be desirable to improve upon existing mass monitoring systems by providing an approach to vehicle mass monitoring which is sensitive to possible tamper attempts so that the mass data obtained can be used reliably, e.g. as evidence of vehicle compliance (or non-compliance) with mass-related conditions of vehicle use. It may also be desirable to develop an approach for providing mass quality data to indicate the health of static and/or dynamic mass data pertaining to a vehicle or axle group of the vehicle.

The discussion of the background to the invention included herein including reference to documents, acts, materials, devices, articles and the like is intended to explain the context of the present invention. This is not to be taken as an admission or a suggestion that any of the material referred to was published, known or part of the common general knowledge as at the priority date of any of the claims.

SUMMARY OF THE INVENTION

Current industry practice for determining vehicle mass is to measure a vehicle's load statically. The driver measures the load using a weighbridge or the like. This measurement may be undertaken as part of a commercial transaction as well as to ensure that the mass is correctly distributed across the axle groups. Measurement is best undertaken at the point of loading as any redistribution or offloading of the mass can easily be done at the same time.

In some cases, an on board mass-monitoring unit (OBMU) may be used at the time of loading, particularly where weighbridges are not available, to obtain static values of axle group mass. This in turn indicates the distribution of the TCM over the axle groups. These static mass values are typically recorded by the driver pressing a button on a device situated in the prime mover cabin, and the static value is stored by the device.

Traditionally, once the vehicle has left the loading site, there is little need or benefit in continuing to monitor mass because there is no easy way to re-distribute or offload part of the mass. Thus, assuming no subsequent loading or unloading, there has been little point in monitoring dynamic mass data. However, the inventors have discovered that data present in dynamic mass measurements obtained from an on board mass-monitoring unit (OBMU) can be used to identify possible tampering events affecting mass records for the vehicle including obtained using the OBMU.

The electronic output signal from sensors in an OBMU can be used to obtain a continuous signal representing dynamic mass values for a period of vehicle use. Dynamic output from load monitoring transducers installed on a vehicle can be used to indicate the performance of suspension during use of the vehicle on roads. For example, the peakiness of the transducer output may be monitored to determine the road friendliness of the particular vehicle. Rapid high amplitude variations in output from the sensors corresponds to high energy impacting of the road surface and this accelerates the break-up of the road surface. Road administrations may use this information to encourage introduction of road friendly suspension systems on freight vehicles.

The continuous mass data signal can be sampled and processed to ascertain vehicle body bounce frequency and axle hop frequency for an axle group on the vehicle. The inventors have discovered that body bounce frequency can be used to ascertain whether there has been a possible tamper event in the OBMU or a possible mass tamper event affecting mass data records obtained via an OBMU or other device and stored in an In Vehicle Unit (IVU) collecting vehicle use (including mass) data. Mass data may originate from load sensors installed on the vehicle or inputs to the IVU from the driver using a self-declaration input device.

Viewed from one aspect, the present invention provides a system for detecting a mass tamper event affecting a vehicle mass record for a vehicle being monitored, the system including a body bounce frequency estimator configured to estimate body bounce frequency for the vehicle; a mass estimator configured to estimate a vehicle mass, m, according to the equation $$m = \frac{k}{\omega_b^2}$$

where k is a constant relating to a suspension system in the vehicle and $\omega_b$ is the estimated body bounce frequency; and a first comparator configured to compare the estimated vehicle mass value with an alternative vehicle mass value and to identify a mass tamper event when the estimated vehicle mass value differs from the alternative vehicle mass value by more than a pre-determined amount.

Ideally, the system also includes an interface configured to communicate mass tamper event data to a remote device.

Preferably, the estimated mass value is determined for an axle group of the vehicle. Where the vehicle contains more than one axle group, several estimates may be calculated and the sum of the estimates determined to provide an estimate of TCM. In one embodiment, the alternative vehicle mass value is obtained from static mass data recorded by a vehicle operator or other human or machine interface. Alternatively, the alternative vehicle mass value may be derived from dynamic mass data values obtained during a period of operation of the vehicle using a calculation method such as a mean of dynamic mass or a median of dynamic mass or a rolling average of dynamic mass. Preferably, the system determines there to have been a mass tamper event when the estimated vehicle mass value differs from the alternative mass value by more than about 2-7%. Alternatively, the predetermined amount may be about 2-5% for a tighter tolerance or about 3-7% for a looser tolerance.

Preferably the system includes an on-board mass-monitoring unit (OBMU) configured to generate and preferably store dynamic mass data during a period of operation of the vehicle. In one embodiment, the body bounce frequency estimator uses Fourier analysis of the dynamic mass data to determine body bounce frequency for the vehicle or an axle group of the vehicle although any suitable approach to determining body bounce frequency may be adopted. Preferably the dynamic mass data is sampled from the OBMU at a sampling frequency of at least 20 Hz, preferably at least 28 Hz and more preferably at least 30 Hz although other sampling rates are contemplated.

In an embodiment, the system includes a data storage element, and is configurable e.g. to store all dynamic mass data, or a subset of time-marked dynamic mass data records corresponding to a period of vehicle operation in which a potential tamper event is detectable.

In one embodiment, the system includes an axle hop frequency estimator configured to estimate an axle hop frequency for the vehicle or for an axle or axle group of the vehicle during a period of vehicle operation. A second comparator is configured to compare the estimated axle hop frequency with a predetermined range of axle hop frequencies and identifying a tamper event when the estimated axle-hop frequency is outside the predetermined range. The predetermined range may be e.g. 10 to 15 Hz and more preferably, 12 to 14 Hz.

In one embodiment of the invention, the system includes a third comparator configured to compare a derived mass value with a static mass value e.g. recorded by the vehicle's driver, and to identify a mass tamper event when the derived mass value and the static mass value differ by more than an acceptable amount. The acceptable amount may be determined according to how the derived mass value is calculated. The acceptable amount may be e.g. 5%, preferably 4% or more preferably between 2% and 3%.

Viewed from another aspect, the present invention provides a system for detecting a mass tamper event affecting a vehicle mass record for a vehicle being monitored, the system including an on-board mass monitoring unit (OBMU) configured to generate dynamic mass data during a period of operation of the vehicle; a mass deriving element configured to derive a mass value using the dynamic mass data; and a mass comparator configured to compare the derived mass value with a static mass value provided by the vehicle's driver and to identify a mass tamper event when the derived mass value and the static mass value differ by more than an acceptable amount.

Ideally, the system also includes an interface configured to communicate mass tamper event data to a remote device.

Preferably the derived mass value is determined using a calculation method selected from the group including but not limited to calculating: a mean of dynamic mass data values; a median of dynamic mass data values; and a rolling average of dynamic mass data values. Alternatively, the derived mass value may be obtained from a mass estimate determined according to other embodiments of the invention.

In one embodiment of the invention, the system further includes a body bounce frequency estimator configured to estimate body bounce frequency for the vehicle or an axle group of the vehicle using the dynamic mass data; a mass estimator configured to estimate a vehicle mass, m, according to the equation $$m = \frac{k}{\omega_b^2}$$

where k is a constant relating to a suspension system in the vehicle and $\omega_b$ is the estimated body bounce frequency; and a first comparator configured to compare the estimated vehicle mass value with an alternative vehicle mass value and to identify a mass tamper event when the estimated vehicle mass value differs from the alternative vehicle mass value by a pre-determined amount.

The system may also include an axle hop frequency estimator configured to estimate an axle hop frequency for the vehicle during a period of operation of the vehicle, and a second comparator configured to compare the estimated axle hop frequency with a predetermined range of axle hop frequencies and identifying a tamper event when the estimated axle-hop frequency is outside the pre-determined range. Preferably the predetermined range of axle hop frequencies is 10 to 15 Hz and more preferably, 12 to 14 Hz.

Viewed from another aspect, the present invention provides a system for recording vehicle mass including: one or more on-board mass monitoring units (OBMUs) configured to generate dynamic mass data during a period of operation of the vehicle; a user interface having input means operable by the user to capture from the dynamic mass data a static mass value; and a storage element configured to store one or more captured static mass values. The system may be configured to store dynamic mass data records in the storage element at regular intervals such as e.g. every 10 seconds or 15 seconds or 30 seconds or 60 seconds.

Viewed from another aspect, the present invention provides a method for detecting a mass tamper event affecting a mass record for a being monitored, including the steps of: processing data obtained during a period of operation of the vehicle to provide an estimate of body bounce frequency $\omega_b$ for the vehicle; estimating a vehicle mass, m, according to the equation:

$$m = \frac{k}{\omega_b^2}$$

where k is a constant relating to a suspension system in the vehicle; and comparing estimated vehicle mass m with an alternative vehicle mass value; wherein a tamper event is detected where the estimated vehicle mass differs from the alternative mass value by more than a predetermined amount.

Preferably, the processed data is dynamic mass data obtained from the OBMU during the period of operation although the data may be obtained from piezoelectric transducers, accelerometers or other transducers on board the vehicle and configured to monitor vehicle vibration, producing outputs that may be processed to determine body bounce frequency. Where dynamic mass data is used, it is preferred that the data is sampled from the OBMU at a sampling frequency of at least 20 Hz, preferably at least 28 Hz and more preferably at least 30 Hz. The sampling frequency may be as high as e.g. 20 kHz although this consumes significant processing and transmission bandwidth.

Preferably, a mass tamper event is detected when the estimated vehicle mass value differs from the alternative mass value by more than about 2-7%. Alternatively, the predetermined amount may be about 2-5% for a tighter tolerance or about 3-7% for a looser tolerance.

In one embodiment of the invention, the method includes the step of storing a subset of the dynamic mass data containing mass values corresponding to a period of vehicle operation during which a mass tamper event is detectable. The method may also include the step of transmitting the subset of dynamic mass data evidencing a mass tamper event to a remote device for analysis or e.g. issuance of a non-compliance report or infringement notice.

In one embodiment of the invention, the method further includes the step of processing the data to estimate axle hop frequency for the vehicle, or an axle or axle group of the vehicle and comparing the estimated axle hop frequency with a pre-determined range of axle hop frequencies. A tamper event is detected when the estimated axle hop frequency is outside the pre-determined range. Preferably the pre-determined range of axle hop frequencies is 10-15 Hz and more preferably 12-14 Hz although different axle hop frequency ranges may be applicable for different vehicle categories such as caravans and the like.

Viewed from yet another aspect, the present invention provides a method for detecting a mass tamper event affecting a vehicle mass record for a vehicle being monitored, including the steps of: collecting dynamic mass data from an on board mass-monitoring unit (OBMU); deriving a mass value using the dynamic mass data; comparing the derived mass value with a static mass value provided e.g. by the vehicle's driver; and identifying a mass tamper event when the derived mass value and the static mass value differ by more than an acceptable amount.

Preferably the derived mass value is determined using a calculation method selected from the group including but not limited to a mean of dynamic mass data values; a median of dynamic mass data values; and a rolling average of dynamic mass data values. The acceptable amount may be e.g. 5%, preferably 4% and more preferably 2 to 3%.

In one embodiment, the method also includes processing the dynamic data values to provide an estimate of body bounce frequency $\omega_b$ for the vehicle; estimating vehicle mass, m, according to the equation:

$$m = \frac{k}{\omega_b^2}$$

where k is a constant relating to a suspension system in the vehicle; and comparing estimated vehicle mass m with an alternative vehicle mass value; wherein a tamper event is detected where the estimated vehicle mass differs from the alternative mass value by more than a predetermined amount. Preferably the pre-determined amount is about 2-7% and more preferably about 2-5% for a tighter tolerance or about 3-7% for a looser tolerance.

It is desirable for the dynamic mass data to be sampled from the OBMU at a sampling frequency of at least twice an axle hop frequency of the vehicle, such as at least 20 Hz, preferably at least 28 Hz and more preferably at least 30 Hz although higher sampling frequencies may be realised, as foreshadowed in the preceding description.

In one embodiment, the method includes storing a subset of the dynamic mass data containing mass values corresponding to a period of vehicle operation during which a mass tamper event is detectable and optionally, transmitting to a remote device the subset of dynamic mass data evidencing a mass tamper event. The method may be performed in real time, as the vehicle is in operation, or it may be performed at a remote device receiving vehicle use data (including dynamic mass data) on a periodic basis or in batches for post-operational processing.

In one embodiment the method further includes processing the dynamic mass data to estimate an axle hop frequency for the vehicle and comparing the estimated axle hop frequency with a pre-determined range of axle hop frequencies. A tamper event is detected when the estimated axle hop frequency is outside the pre-determined range. Preferably the pre-determined range of axle hop frequencies is 10-15 Hz and more preferably 12-14 Hz although other frequencies are contemplated for different vehicle types and axle combinations.

Viewed from yet another aspect, the present invention provides a method of recording vehicle mass including the steps of: monitoring output from an on board mass-monitoring unit (OBMU) associated with the vehicle and generating dynamic mass data during a period of vehicle operation; receiving an input from a user of the vehicle and causing a processor to capture from the dynamic mass data a static mass value; and storing the static mass value in a storage element.

BRIEF DESCRIPTION OF THE DRAWINGS

The present invention will now be described in greater detail with reference to the accompanying drawings. It is to be understood that the embodiments shown are examples only and are not to be taken as limiting the scope of the invention as defined in the claims appended hereto.

DETAILED DESCRIPTION

For convenience, the examples provided herein use dynamic mass data obtained during a period of vehicle operation from an OBMU installed on the vehicle to ascertain vehicle body bounce frequency. However it is to be understood that body bounce frequency may be determined using any suitable method or device and this may not necessarily involve use of dynamic mass data per se. For example, body bounce frequency (and indeed axle hop frequency) may be determined using output from piezoelectric transducers or accelerometers fitted to the vehicle and by application e.g. of Fourier analysis.

Figure 1:
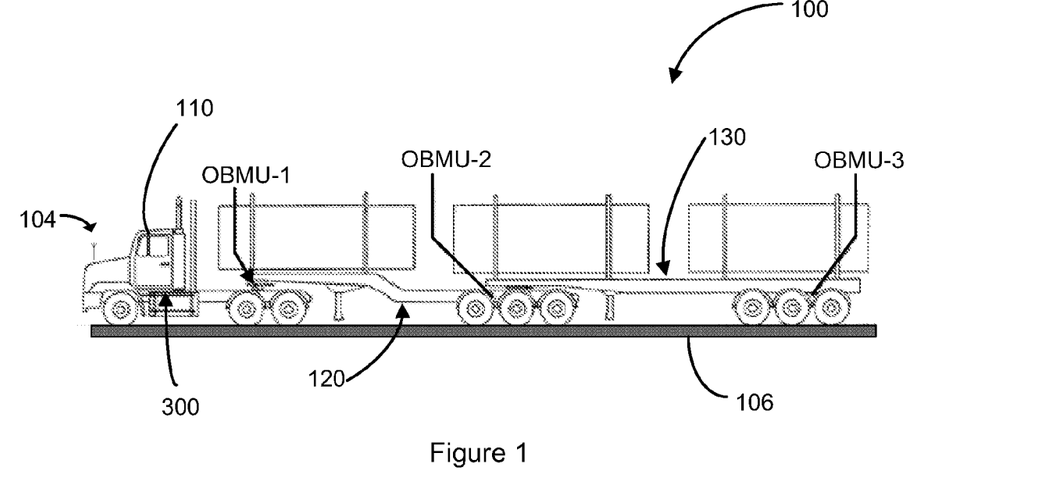
FIG. 1 is a schematic illustration of a vehicle fitted with OBMUs in accordance with an embodiment of the invention.

Referring firstly to FIG. 1 there is shown a heavy vehicle 100 comprising a prime mover 110 and two trailers 120, 130. The vehicle is fitted with three OMBUs. OBMU-1 contains a load cell fitted at the turntable. OBMU-2 and OBMU-3 each contain air pressure transducers fitted to the air outlet lines from the airbag suspension systems provided for each trailer. Vehicle 100 is also fitted with an In Vehicle Unit (IVU) 300 which receives signals from each of the OBMUs fitted to the vehicle. Signals from the OMBU can be transmitted directly to a remote device via antenna 104, or indirectly through the IVU (also transmitting via antenna 104).

In FIG. 1, vehicle 100 is shown stationery on a weighbridge 106 typical of the kind used during loading of the vehicle. Mass data obtained from the weighbridge is recorded by the driver and/or operator of the weighbridge for use in commercial dealings. According to an embodiment of the present invention, the vehicle driver records (i.e. "self-declares") the vehicle mass as determined by weighbridge 106 using an electronic self-declaration (SD) device which communicates with and stores the mass value electronically in an IVU. In some instances, paper logbook recording of vehicle mass may still occur. Self-declared mass values can then be used according to embodiments of the invention, to detect mass tamper events. Detection may be performed by an on-board device and/or a remotely located device receiving data transmitted or downloaded from the IVU and/or the OBMU(s).

Figure 2:
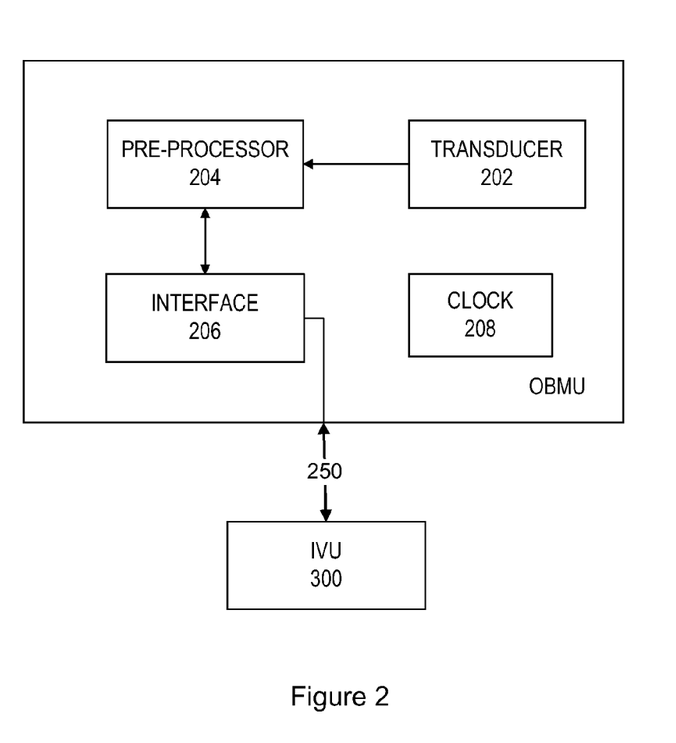
FIG. 2 is a schematic illustration of an on-board mass-monitoring unit (OBMU) for use with an embodiment of the invention.

FIG. 2 is a schematic illustration of components of an OBMU according to an embodiment of the invention. The OBMU includes a transducer 202 in the form of a load cell, air pressure sensor (strain gauge) or the like which converts pressure exerted by the vehicle and its load on the transducer to an electrical potential that is fed into pre-processor 204 which typically also includes memory. Interface 206 enables access to data stored in the pre-processor, and/or transmission of data to other devices such as IVU 300 or other remotely located devices. Transmission of data from the OBMU to the IVU may occur through transmission lines 250 connecting the vehicle's IVU with the OBMU, or wirelessly using RF or other (secure) wireless transmission protocols. Each OBMU has an internal clock 208.

Each OBMU continuously collects data representing date and time and axle group mass for the axle group for which the OBMU is installed. Preferably, each OBMU also collects and stores data relevant to calibration of the OBMU. It is intended that OBMUs are calibrated regularly. Calibration intervals may be prescribed by a regulatory authority or other entity. Self-declared mass data for the vehicle or an axle group of the vehicle e.g. entered using a user interface/Self Declaration (SD) device operated by the vehicle driver (or through a remote device) may also be stored in the OBMU or in an IVU or other device associated with the vehicle.

Preferably, the SD device includes a button or the like that can be actuated by the driver to store a static mass value when the driver is of the view that the conditions for static recordal of mass using the OBMU are ideal (e.g. on level ground, brakes off). Alternatively, the vehicle may be fitted with sensors configured to determine automatically when conditions are ideal for storing a static mass value from the dynamic data. Thus, the driver may be notified when it is appropriate to make a self-declared static mass entry, or the entry may be made automatically based on the signals from the sensors.

In a preferred embodiment, the OBMU also generates one or more kinds of mass quality data which are stored in records indicating the health or quality of mass data obtained for each axle group. In a preferred embodiment, each OBMU generates Mass data Quality Records A (MQRA) and Mass data Quality Records B (MQRB).

MQRA records are generated by the OBMU based on dynamic mass data produced in the unit and stored in the OBMU on a periodic basis. In a preferred embodiment, a MQRA record includes mass data stored automatically and generated by the OBMU every 30 seconds (e.g. at the $0^{th}$ and $30^{th}$ second of every minute) for a continuous period while the vehicle is in operation. MQRA data may be used to derive a mass value e.g. the mean or the median or a rolling average (e.g. a 30 second running average) of the dynamic mass measurements obtained by the OBMU over a period of time. In embodiments of the invention, the derived mass value is used to identify tamper attempts affecting the OBMU. The derived mass value may be compared with alternative mass value such as e.g. a self-declared mass value or a mass value estimated according to embodiments of the present invention to detect a mass tamper event. Typically, tamper events indicated by MQRA records relate to possible violations of the accepted OBMU operation procedures. These include obtaining OBMU values only when the vehicle is on level ground with brakes off.

MQRB records contain full sets of dynamic mass data (rather than periodic samples of dynamic mass data) sampled at a frequency sufficient to avoid aliasing. Dynamic mass data obtained from an OBMU is oscillatory and can be used to ascertain body bounce frequency and axle hop frequency for the axle group in which the OBMU is located.

Body bounce occurs with the body motions of a vehicle where the vehicle's body (a sprung mass) bounces with respect to the vehicle's tyres (an unsprung mass) and the pavement surface. Body bounce frequency may range from about 1.5 Hz to about 4 Hz although for heavy vehicles typical of the kind that the present invention is primarily directed to, body bounce frequency is about 2 Hz.

Axle hop frequency corresponds to the high frequency responses occurring when the axle and tyres vibrate between the vehicle body and the pavement surface. Axle hop frequency may range from e.g. about 10 to 15 Hz although lower ranges in particular may be contemplated. For the heavy vehicles of the type considered herein, axle hop frequency is typically about 12 Hz. Since axle hop frequency is the highest frequency component of the MQRB data, a sampling rate of say 30 Hz being at least twice the axle hop frequency should suffice to avoid aliasing.

Body bounce frequency can be determined from the dynamic mass data using Fourier analysis, as would be known to a person skilled in the art of vibration analysis. Body bounce frequency, once determined using the dynamic mass (or other) data records, can be used to calculate an estimate of mass using the equation:

$$\omega_b = \sqrt{\frac{k}{m}} \qquad \text{(Equation 1)}$$

where $\omega_b$ is the body bounce frequency in radians per second and k is a constant relating to a suspension system of the vehicle (i.e. the axle group for which mass is being calculated). Equation 1 can be rearranged to determine an estimate of vehicle mass as:

$$m = \frac{k}{\omega_b^2} \qquad \text{(Equation 2)}$$

Mass may be determined using ordinary frequency (measured in Hertz) by substituting the angular frequency term, $\omega_b$ with $2\pi f$ resulting in the following relationship:

$$m = \frac{k}{(2\pi f)^2} \qquad \text{(Equation 3)}$$

Typical values for k can be determined by reference to a look up table containing k values applicable to a particular axle group or suspension type. Alternatively, since k affects the mass estimates determined by application of Equation 2, k can be determined uniquely for each vehicle and for each axle group associated with the vehicle by performing an assessment of the vehicle. This involves measuring the body bounce frequency for the vehicle (e.g. by running the vehicle over a bump or bridge test) when it is loaded with a known mass and calculating k for the axle group using Equation 1 transposed as follows:

$$k=m(2\pi f_c)^2 \qquad \text{(Equation 4)}$$

Applying Equation 4 in a scenario where a vehicle having an Axle Group Mass (AGM) of 20,000 kg completes a bump test with a $f_b$ of 2 Hz yields a k value of 3,158 kNm$^{-1}$ for the axle group. Since it is desirable for each OBMU on a vehicle to be calibrated on a regular basis, it may be desirable to also re-calculate the value of k for the axle group at the same time. This enables adjustment for drift in the value of k attributable to aging and/or leaking air bags in air bag suspension systems and changes in the performance of the suspension generally.

It may be the case that the value of k may be generalisable e.g. for particular type of axle group or axle groups from the same manufacturer which have the same k value, for air bags originating from particular manufacturers, for spring suspension systems, different axle groups or the like. Hence individual measurement or determination of k for each individual axle group may not be necessary. However, in the event that there is significant variance in k values for a particular type of axle group, even when they originate from the same manufacturer, then individual determinations of the actual k value for that axle group may be necessary.

Figure 3:
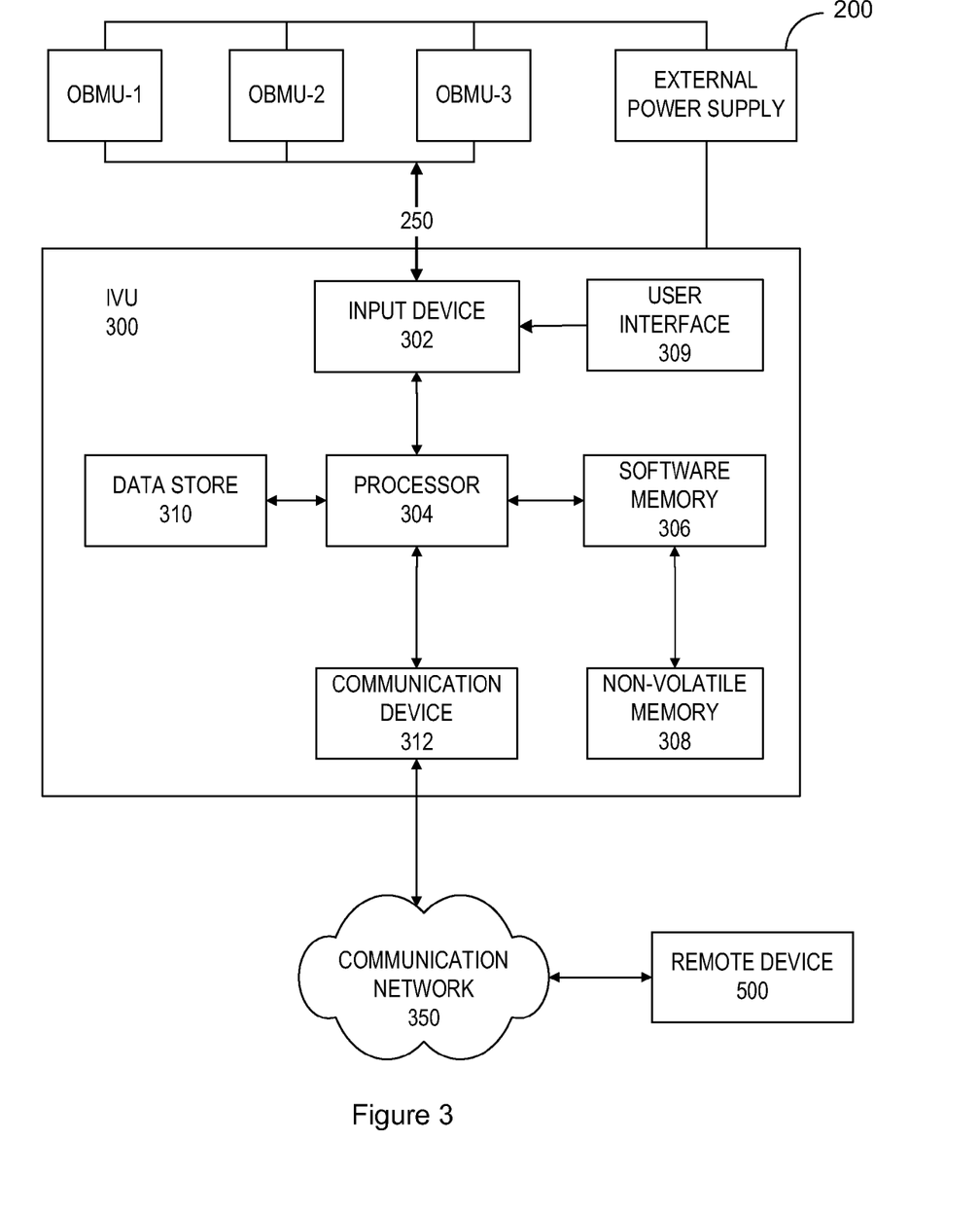
FIG. 3 is a schematic illustration of an In-Vehicle-Unit (IVU) in communication with OBMUs installed in a vehicle for use in a system for monitoring vehicle use.

FIG. 3 is a schematic illustration showing OBMU-1, OBMU-2 and OBMU-3 in communication, via link 250 with IVU 300. Each OBMU and the IVU are connected to external power supply 200. The IVU has an input device 302 receiving mass data records, MQRA and MQRB records from the respective OBMUs together with other data which may be generated by the OMBUs. Processor 304 processes the data for storage in data store 310 and/or for transmission via communication device 312 and communication network 350 to a remote device 500. In a preferred embodiment, the remote device is in wireless communication with the IVU and is located at a place of business operated by a Service Provider who participates in a system for monitoring vehicle use with which the vehicle having the IVU installed is also participating. The IVU includes software memory 306 containing instructions for operating the processor and non-volatile memory 308.

Figure 4:
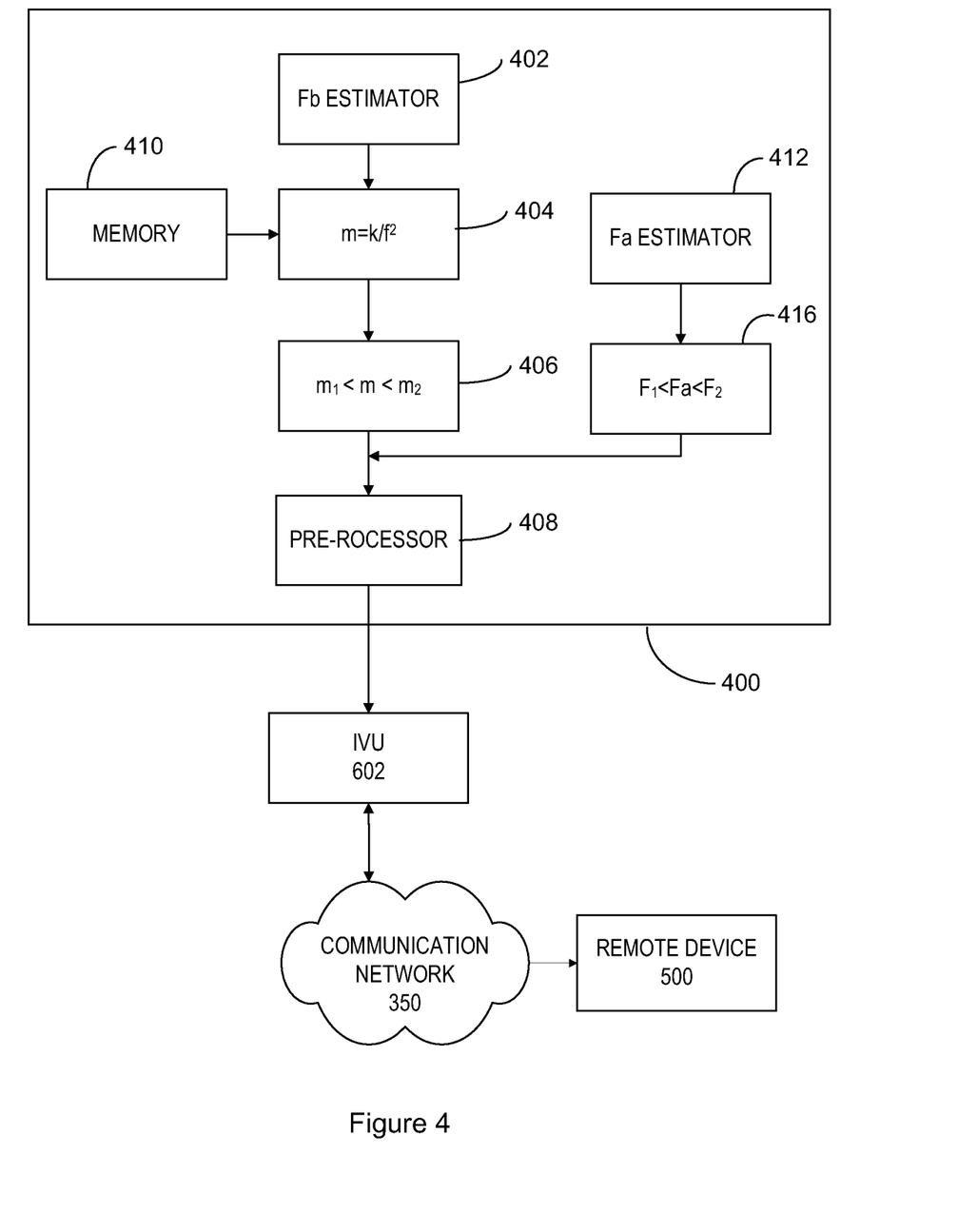
FIG. 4 is a schematic illustration of a component of a system for detecting a mass tamper event according to an embodiment of the present invention.

FIG. 4 is a schematic illustration of a device 400 for detecting a mass tamper event according to an embodiment of the invention. The device 400 may be located within an OBMU and may determine mass tamper events affecting mass data for that axle group. In this arrangement, real time processing may be possible, obviating the need to transmit all dynamic mass data records and MQRA, MQRB records for each axle group in the vehicle to the remote device, since only data corresponding to a tamper event is relevant.

Alternatively, device 400 may be located within an IVU 300 located on the vehicle. In this embodiment, the IVU processor may perform the functions of the device 400, or the IVU may contain a separate, dedicated mass processor. Thus device 400, when located in the IVU may be configured to process dynamic mass data from all OBMUs associated with the vehicle to ascertain whether there has been a mass tamper event affecting any axle group. In this arrangement, it is possible to achieve on-board and near real time processing of mass data which may also obviate the need to transmit all dynamic mass data records and MQRA, MQRB records for each axle group to the remote device.

Alternatively/additionally, the mass tamper event detecting device 400 may be located remotely from the vehicle. In such arrangement, all mass data records and MQRA, MQRB records are transmitted to the remote device 500 which contains or is in communication with device 400 for detecting tamper events. This arrangement, when employed in a system for monitoring vehicle use to an evidentiary standard, has high data transmission requirements and as such, may be unrealisable for real-time processing. Rather, mass data from vehicles may be downloaded or transmitted to the remote device 500 periodically (e.g. once per 24 hours) for tamper analysis and detection.

The device includes a body bounce frequency (Fb) estimator 402 and a mass estimator 404 applying Equation 2. The device may also contain memory 410 storing a value for k or a look-up table containing a range of k values that have been pre-defined for a selection of different vehicle types/axle groups or pre-determined uniquely for those axle groups. The relevant type may be communicated to the device 400 from the IVU 300 and/or from trailer identification devices (TIDs) installed in each trailer. First comparator 406 compares the estimated mass value with an alternative mass value for the vehicle and pre-processor 408 determines that a tamper event has occurred when the estimated mass value differs from the alternative mass value by a pre-determined amount.

In one embodiment, device 400 also includes an axle hop frequency (Fa) estimator 412 and a second comparator 416 which is configured to compare the axle hop frequency with a predefined range of frequencies. The device determines that a tamper event has occurred when the estimated axle hop frequency is outside the pre-determined range. In one embodiment, the pre-determined range is 10-15 Hz although for heavy vehicles a preferred range is 12-14 Hz.

Figure 5A:
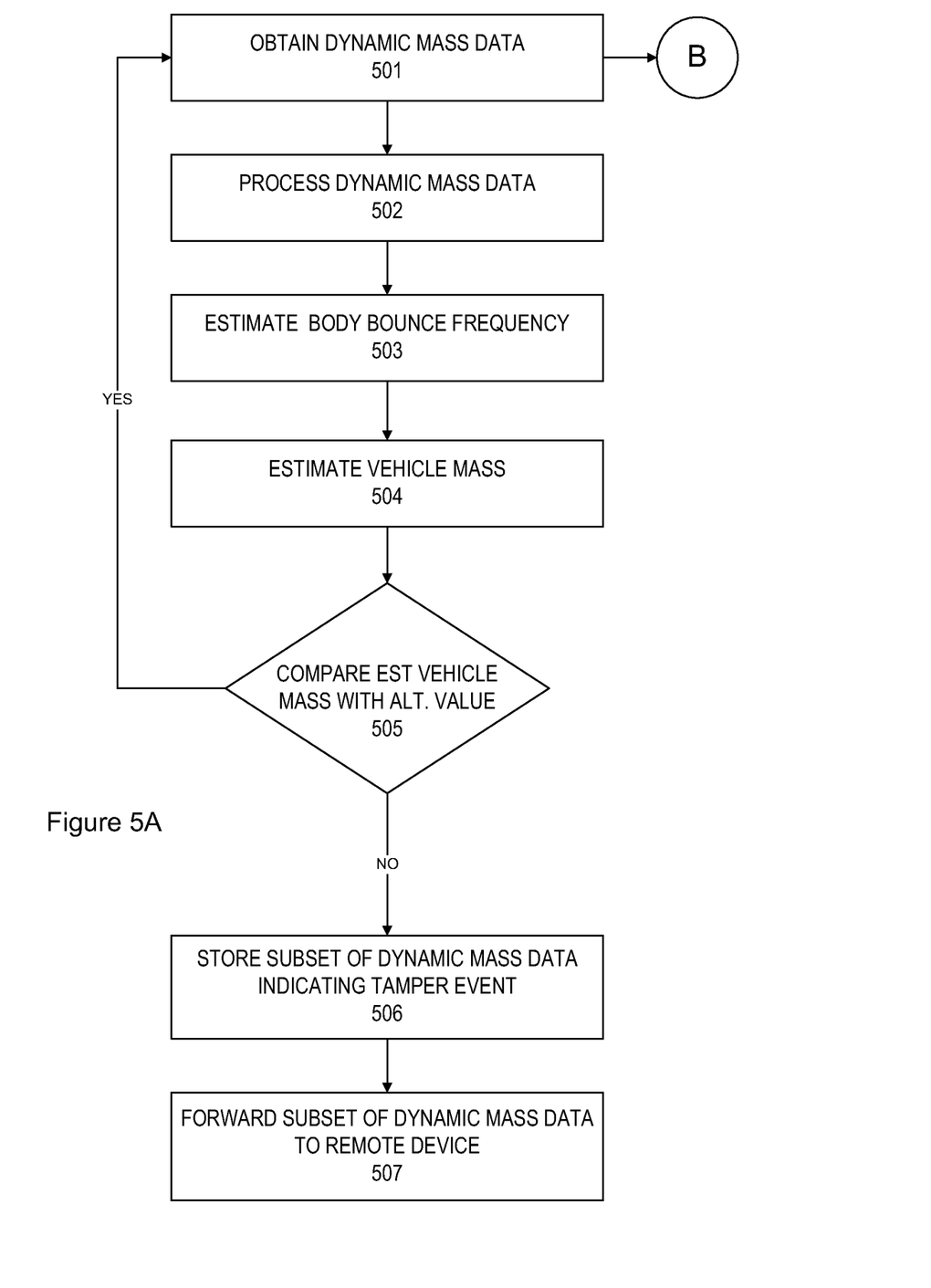
FIGS. 5A and 5B illustrate steps in a method of detecting a tamper event, according to an embodiment of the present invention.
Figure 5B:
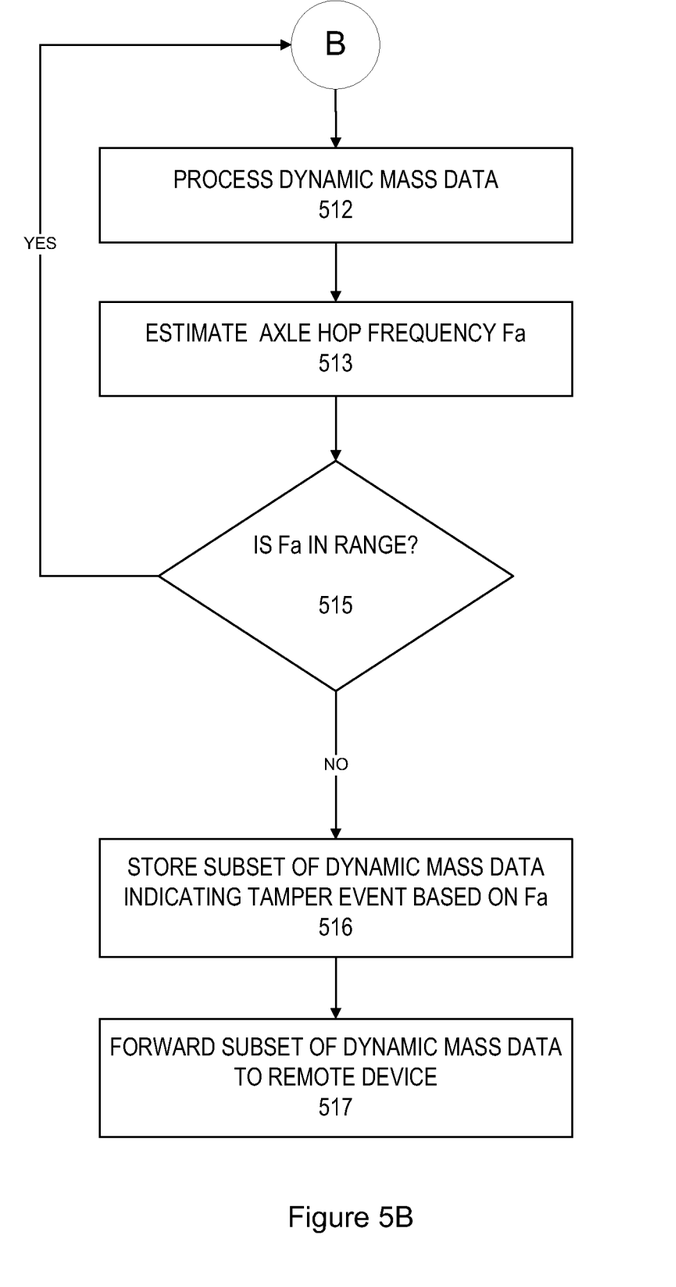

FIGS. 5*a* and 5*b* are flow diagrams showing steps in a method for detecting a mass tamper event according to an embodiment of the invention. The steps performed in FIGS. 5A and 5B may be performed in succession or in parallel.

In a step 501, dynamic mass data is obtained from an OBMU associated with an axle group of the vehicle. The mass data are sampled at a sufficiently high rate to avoid aliasing, as described in the foregoing. In a step 502, the dynamic mass data are processed to determine body bounce frequency for the axle group in a step 503. In a step 504 the vehicle mass for the axle group is estimated by application of Equation 2 and in a step 505 the estimated vehicle mass is compared with an alternative vehicle mass (e.g. as derived or self declared for that axle group). If the estimated vehicle mass value is sufficiently close to the alternative value then it will be identified as in range, and the process will continue by assessing further dynamic mass data in step 501. Conversely, if the estimated vehicle mass value is outside the acceptable range, then it will be assumed that a possible tamper event has occurred.

In one embodiment, a subset of dynamic mass data corresponding to the period of time during which the tamper event occurred is stored in step 506. Preferably this is in the form of MQRB records. Following, in a step 507 the relevant subset of dynamic mass data (i.e. MQRB records) are stored as "evidence" of a mass tamper event and e.g. transmitted to a remote device for possible inclusion in a non-compliance report (NCR) or infringement notice. Alternatively, all dynamic mass data records may be transmitted to the remote device. The remote device may be located at the premises of a service provider participating in a vehicle monitoring system or a road authority or other entity authorised to receive the data.

When assessing whether the estimated vehicle mass value is in range (i.e. step 505), the accuracy level required depends on the purpose for which the tamper evidence is being obtained. For regulatory purposes, it is preferred that the mass information collected for a heavy vehicle include both axle group mass (AGM) and total combination mass (TCM). AGM accuracy is preferably specified for any axle group regardless of the number of axles in the group because AGM accuracy is independent of the number of axles but is affected by the number of mass sensors employed for the group. It is assumed that at least one mass sensor is used per axle group. Preferably, the accuracy is in the range of 500 kg per axle group. This is equivalent to about 2.5% for a fully laden tri-axle group (20 mega tonnes or above) when compared with weighbridge measurements.

In contrast, TCM accuracies are typically specified for different vehicle combination types because different vehicle/combination types have different numbers of axle groups and thus different numbers of mass sensors and TCM accuracies. TCM accuracies can be determined using a tighter or looser tolerance. A tighter tolerance assumes that the accuracy of each mass sensor is independent of the others. A looser tolerance assumes that the accuracy of each mass sensor is fully correlated to the others, hence the tolerance for the TCM is the sum of tolerances for all mass sensors. In one embodiment, a tighter tolerance (2-5%) is preferable although looser tolerances (e.g. 3-7%) may be satisfactory in other applications.

In FIG. 5B, the dynamic mass data is processed in a step 512 and used in a step 513 to estimate axle hop frequency. In a step 515, the estimated axle hop frequency is compared with a pre-defined range of axle hop frequencies and, if the estimated axle hop frequency is in range, monitoring continues back to B at step 501. If the estimated axle hop frequency is outside the pre-determined range, then it is determined that there has been tampering with the OBMU and, in a step 516 a subset of mass (or other) data, from which the axle hop frequency has been estimated, is stored. The subset of data may then be forwarded in a step 517 to a remote device for use, e.g. in a non-compliance report issued as part of a broader system for monitoring vehicle use.

Figure 6:
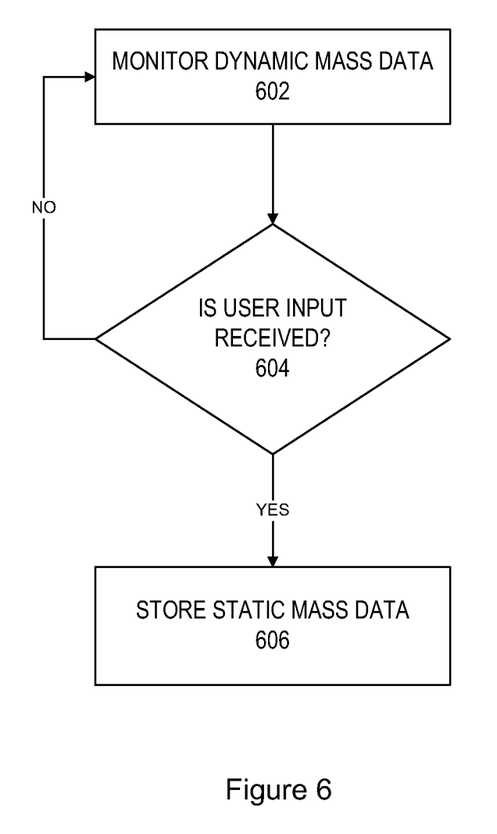
FIG. 6 is a flow diagram showing steps in a method for recording vehicle mass.

FIG. 6 is a flow diagram showing steps in a method for recording vehicle mass. In a step 602 dynamic mass data generated by the OMBU is monitored. If, in a step 604, a user input is received (e.g. via input device 309), a dynamic mass data value is captured and stored as a static mass data value in step 606. If no user input is received at step 604, dynamic mass monitoring continues. The static mass value is stored in storage element such as data store 310 preferably with data corresponding to the vehicle's GPS location and the time at the instant the static value was recorded.

In one embodiment, the system and method of the present invention and the various parts described herein are provided for use with a comprehensive system for monitoring vehicle use. Aspects of such a system are described in detail in International Patent Application PCT/AU2008/001749 entitled "System for Monitoring Vehicle Use" the entire contents of which is hereby incorporated herein by reference.

In one embodiment, MQRA records are transmitted, periodically or in batches (e.g. every 24 hours) or at the termination of the period of vehicle operation, to a remote device located e.g. with a Service Provider which uses the MQRA records to assess compliance with Intelligent Mass Conditions (IMCs) granted to that vehicle. IMCs are a form of permission which authorises a vehicle, to which the IMC has been granted, to access a road network, on the basis that the vehicle complies with vehicle mass limitations imposed upon it by the Jurisdiction (e.g. road authority) granting the permission (i.e. the IMC). In order to assess compliance, the mass data must be reliable to an evidentiary level since non-compliance typically results in issuance to the vehicle operator of a Non Compliance Report (NCR) for which an infringement notice may be issued. Identifying mass tamper events contributes to reliability and corroboration of the mass data used by the service provider to assess compliance with an IMC.

Typically, an IMC is related to a mass map or a set of global positioning satellite (GPS) coordinates for which the mass condition is applicable. GPS coordinates of the vehicle may be obtained from any GPS or similar positioning system or device located in the vehicle. Preferably, this is incorporated into an IVU installed in the prime mover.

The fitment of an OBMU system to a vehicle trailer can be undertaken at the time the trailer is being constructed with additional after-market fitting of sensors and indicators to the prime mover. Alternatively/additionally, a complete fitment can be accomplished as an after-market sale. A typical air pressure transducer system would cost around $1,500-$2,000 for an axle group (say, 3 to 4 axles) whereas an equivalent load cell system for an axle group may cost from $9,000-$12,000 depending on the number of load cells required. Thus, there is an economic advantage to only fit load cells where no airbag suspension system exists. A typical installation would see load cells on the prime mover and air pressure transducers on the trailers.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components or group thereof.

It is to be understood that various modifications, additions and/or alterations may be made to the parts previously described without departing from the ambit of the present invention as defined in the claims appended hereto.

It is to be understood that the following claims are provided by way of example only, and are not intended to limit the scope of what may be claimed in any future application. Features may be added to or omitted from the claims at a later date so as to further define or re-define the invention or inventions.

The claims defining the invention are as follows:

1. A system for detecting a vehicle mass tamper event affecting a vehicle mass record for a vehicle being monitored, the system including:
   a. a body bounce frequency estimator device installed on the vehicle and configured to estimate a body bounce frequency of the vehicle during a period of operation of the vehicle;
   b. a computer processor configured to estimate a vehicle mass, m, according to the equation $m = k/(\omega_b)^2$ where k is a constant relating to a suspension system in the vehicle and $\omega_b$ is the estimated body bounce frequency;
   c. the computer processor configured to compare the estimated vehicle mass with an alternative vehicle mass value to identify a vehicle mass tamper event when the estimate vehicle mass differs from the alternative vehicle mass value by more than a pre-determined amount;
   d. a data storage element in communication with the computer processor and configured to store a subset of processor determined time-marked estimate vehicle mass records corresponding to a period of vehicle operation during which one or more vehicle mass tamper events are detectable; and
   e. an interface in communication with the computer processor and the data storage element and configured to transmit to a remote device the subset of the estimated vehicle mass records as evidence of the one or more vehicle mass tamper events.

2. The system for detecting a vehicle mass tamper event according to claim 1 wherein the pre-determined amount is 2-7%.

3. The system for detecting a vehicle mass tamper event according to claim 2 wherein the pre-determined amount is 2-5% for a tighter tolerance.

4. The system for detecting a vehicle mass tamper event according to claim 2, wherein the pre-determined amount is 3-7% for a looser tolerance.

5. The system for detecting a vehicle mass tamper event according to claim 1, further including an on-board mass-monitoring unit (OBMU) configured to generate dynamic mass data during a period of operation of the vehicle, wherein the body bounce frequency estimator device uses the dynamic mass data to determine body bounce frequency for the vehicle or an axle group of the vehicle.

6. The system for detecting a vehicle mass tamper event according to claim 5 wherein the dynamic mass data is sampled from the OBMU at a sampling frequency of at least 20 Hz.

7. The system for detecting a vehicle mass tamper event according to claim 5, wherein the data storage element is further configured to store a subset of the processor determined time-marked dynamic mass data records corresponding to a period of vehicle operation in which a vehicle mass tamper event is detectable.

8. The system for detecting a vehicle mass tamper event according to claim 1, wherein the computer processor is further configured to estimate an axle hop frequency for the vehicle during a period of operation of the vehicle, and to compare the estimated axle hop frequency with a predetermined range of axle hop frequencies to identify automatically a vehicle mass tamper event when the estimated axle-hop frequency is outside the predetermined range.

9. The system for detecting a vehicle mass tamper event according to claim 8 wherein the predetermined range is 10 to 15 Hz.

10. The system for detecting a vehicle mass tamper event according to claim 1, wherein the alternative vehicle mass value is obtained from static mass data recorded by a vehicle operator or other human or machine interface, or derived from dynamic mass data values obtained during a period of operation of the vehicle using a calculation selected from the group including:
a mean of dynamic mass data values;
a median of dynamic mass data values; and
a rolling average of dynamic mass data values.

11. The system for detecting a vehicle mass tamper event according to claim 10 wherein the computer processor is further configured to compare a derived mass value with a static mass value and to identify a vehicle mass tamper event when the derived mass value and the static mass value differ by more than a predetermined amount.

12. A system for detecting a vehicle mass tamper event affecting a vehicle mass record for a vehicle being monitored, the system including:
a. an on-board mass monitoring unit (OBMU) fitted to the vehicle and configured to generate dynamic mass data during a period of operation of the vehicle;
b. a computer processor configured to derive a mass value using the dynamic mass data;
c. The computer processor configured to compare the derived mass value with a static mass value and to identify automatically a vehicle mass tamper event when the derived mass value and the static mass value differ by more than a predetermined amount;
d. a data storage element in communication with the computer processor and configured to store a subset of processor determined time-marked dynamic mass data records corresponding to a period of vehicle operation during which one or more vehicle mass tamper events is detectable; and
e. an interface in communication with the computer processor and the data storage element and configured to transmit to a remote device the subset of dynamic mass data records as evidence of the one or more vehicle mass tamper events.

13. The system for detecting a vehicle mass tamper event according to claim 12, wherein:
a. the on-board mass monitoring unit (OBMU) includes a body bounce frequency estimator configured to estimate a body bounce frequency for the vehicle or an axle group of the vehicle using the dynamic mass data;
b. the computer processor adapted to estimate a vehicle mass, m, according to the equation $$m = \frac{k}{\omega_b^2}$$

where k is a constant relating to a suspension system in the vehicle and $\omega_b$ is the estimated body bounce frequency; and
c. the processor configured to compare the estimated vehicle mass with an alternative vehicle mass value and to identify automatically a vehicle mass tamper event when the estimated vehicle mass differs from the alternative vehicle mass value by more than a pre-determined amount.

14. A system for detecting a mass tamper event according to claim 13 wherein the pre-determined amount is 2-7%.

15. The system for detecting a vehicle mass tamper event according to claim 12, wherein the computer processor is further configured to estimate an axle hop frequency for the vehicle during a period of operation of the vehicle, and to compare the estimated axle hop frequency with a predetermined range of axle hop frequencies to identify automatically a vehicle mass tamper event when the estimated axle-hop frequency is outside the predetermined range.

16. A system for detecting a mass tamper event according to claim 15 wherein the predetermined range is 10 to 15 Hz.

17. The system for detecting a vehicle mass tamper event according to claim 12, wherein the derived mass value is determined using a calculation method selected from the group including:
mean of dynamic mass data values;
a median of dynamic mass data values; and
a rolling average of dynamic mass data values.

18. The system for detecting a mass tamper event according to claim 12, the system being further adapted to record vehicle mass data values and including:
a. a user interface having input means operable by the user to capture from the dynamic mass data a static mass value; and
b. a storage element configured to store one or more captured static mass values.

19. The system for detecting a vehicle mass tamper event according to claim 18, wherein the storage element is configured to store dynamic mass data values at regular intervals.

20. The system for detecting a vehicle mass tamper event according to claim 18, wherein the storage element is configurable to store one or both of dynamic mass values and static mass values for each of a plurality of axle groups in a vehicle.

21. A method for detecting a vehicle mass tamper event affecting a vehicle mass record for a vehicle being monitored, including the steps of:
a. receiving and processing at a computer processor, data obtained during a period of operation of the vehicle to provide an estimate of body bounce frequency $\omega_b$ for the vehicle;
b. operating the computer processor to estimate estimating a vehicle mass, m, according to the equation:

$$m = \frac{k}{\omega_b^2}$$

where k is a constant relating to a suspension system in the vehicle; and
c. operating the computer processor to compare the estimated vehicle mass m with an alternative vehicle mass value;

d. operating the computer processor to identify automatically a vehicle mass tamper event when the estimated vehicle mass differs from the alternative vehicle mass value by more than a predetermined amount;

e. storing on a data storage element accessible by the computer processor, a subset of the estimated vehicle mass data containing values corresponding to a period of vehicle operation during which one or more vehicle mass tamper events are detectable; and f. operating the computer processor to transmit to a remote device, the subset of the estimated vehicle mass data as evidence of the one or more vehicle mass tamper events.

22. The method for detecting a vehicle mass tamper event according to claim 21 wherein the processed data is dynamic mass data obtained during the period of vehicle operation from an on board mass-monitoring unit (OBMU) fitted to the vehicle.

23. The method for detecting a vehicle mass tamper event according to claim 22 wherein the dynamic mass data is sampled from the OBMU at a sampling frequency which is at least double an axle hop frequency of the vehicle.

24. The method for detecting a vehicle mass tamper event according to claim 22, wherein the dynamic mass data is sampled from the OBMU at a sampling frequency of at least 20 Hz.

25. The method for detecting a vehicle mass tamper event according to claim 22, including the step of storing on the data storage element accessible by the computer processor, a subset of the dynamic mass data containing mass values corresponding to a period of vehicle operation during which a vehicle mass tamper event is detectable.

26. The method for detecting a vehicle mass tamper event according to claim 25 including the step of operating the computer processor to transmit to a remote device the subset of the dynamic mass data as evidence of a vehicle mass tamper event.

27. The method for detecting a vehicle mass tamper event according to claim 21, wherein the pre-determined amount is 2-7%.

28. The method for detecting a vehicle mass tamper event according to claim 21, including the step of receiving and processing at the computer processor data for estimating axle hop frequency for the vehicle and operating the computer processor to identify automatically a vehicle mass tamper event when the estimated axle hop frequency is outside a pre-determined range of axle hop frequencies.

29. The method for detecting a vehicle mass tamper event according to claim 28 wherein the pre-determined range of axle hop frequencies is 10-15 Hz.

30. A method for detecting a vehicle mass tamper event affecting a vehicle mass record for a vehicle being monitored, including the steps of:

a. operating a computer processor to collect dynamic mass data from an on board mass-monitoring unit (OBMU) fitted to the vehicle, during a period of vehicle operation;

b. operating the computer processor to derive a mass value using the dynamic mass data;

c. operating the computer processor to compare the derived mass value with a static mass value provided to the computer processor by the vehicle's driver; and d. operating the computer process to identify automatically a vehicle mass tamper event when the derived mass value and the static mass value differ by more than a predetermined amount;

e. storing on a data storage element accessible by the computer processor, a subset of the dynamic mass data containing mass values corresponding to a period of vehicle operation during which one or more vehicle mass tamper events are detectable; and f. operating the computer processor to transmit to a remote device the subset of the dynamic mass data as evidence of the one or more vehicle mass tamper events.

31. The method for detecting a vehicle mass tamper event according to claim 30, wherein the derived mass value is determined by the computer processor using a calculation method selected from the group including:

a mean of dynamic mass data values;
a median of dynamic mass data values; and
a rolling average of dynamic mass data values.

32. The method for detecting a vehicle mass tamper event according to claim 30, including the steps of:

a. operating the computer processor to estimate, using the dynamic mass data values, a body bounce frequency $\omega_b$ for the vehicle;

b. operating the computer processor to calculate a vehicle mass, m, according to the equation:

$$m = \frac{k}{\omega_b^2}$$

where k is a constant relating to a suspension system in the vehicle; and c. operating the computer processor to identify automatically a vehicle mass tamper event when the calculated vehicle mass m differs from the alternative mass value by a predetermined amount.

33. The method for detecting a vehicle mass tamper event according to claim 32, wherein the pre-determined amount is 2-7%.

34. The method for detecting a vehicle mass tamper event according to claim 30, including the step of operating the computer processor to sample the dynamic mass data from the OBMU at a sampling frequency of at least twice an axle hop frequency of the vehicle.

35. The method for detecting a vehicle mass tamper event according to claim 30, wherein the computer processor processes the dynamic mass data to estimate an axle hop frequency for the vehicle and compares the estimated axle hop frequency with a pre-determined range of axle hop frequencies, and identifies a vehicle mass tamper event automatically, when the estimated axle hop frequency is outside the pre-determined range.

36. The method for detecting a vehicle mass tamper event according to claim 35 wherein the pre-determined range of axle hop frequencies is 10-15 Hz.

37. The method for detecting a vehicle mass tamper event according to claim 30, further including the steps of:

a. operating the computer processor to monitor output from an on board mass-monitoring unit (OBMU) associated with the vehicle and generate dynamic mass data during a period of vehicle operation;

b. operating the computer processor to receive an input from a user of the vehicle causing the computer processor to capture from the dynamic mass data a static mass value; and c. storing on a data storage element accessible by the computer processor, the captured static mass value in a storage element.

38. The method for detecting a vehicle mass tamper event according to claim 37 including the step of storing in the data storage element a set of dynamic mass values captured from the dynamic mass data at regular intervals during a period of vehicle operation.

\* \* \* \* \*